UNITED STATES PATENT OFFICE.

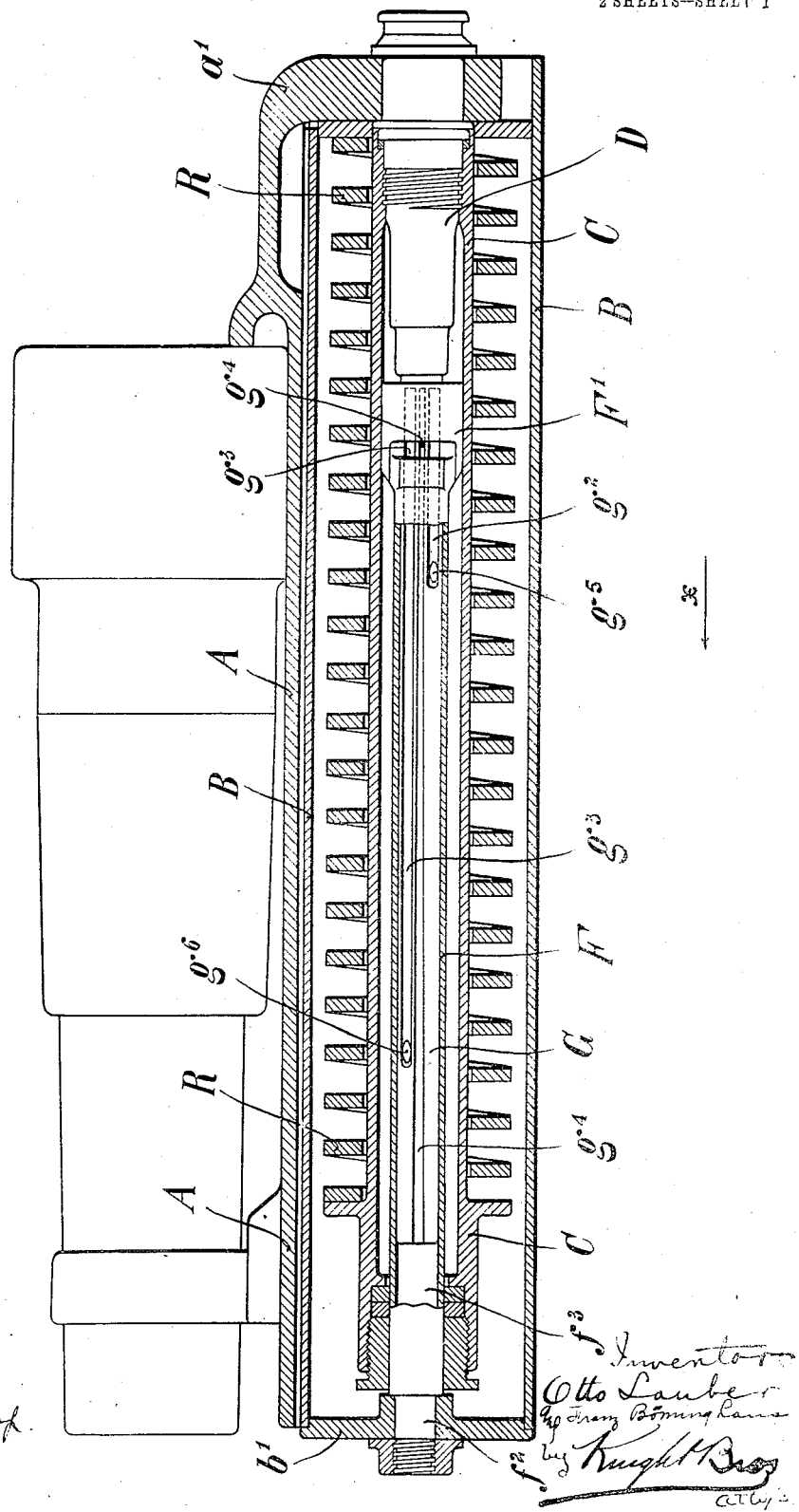

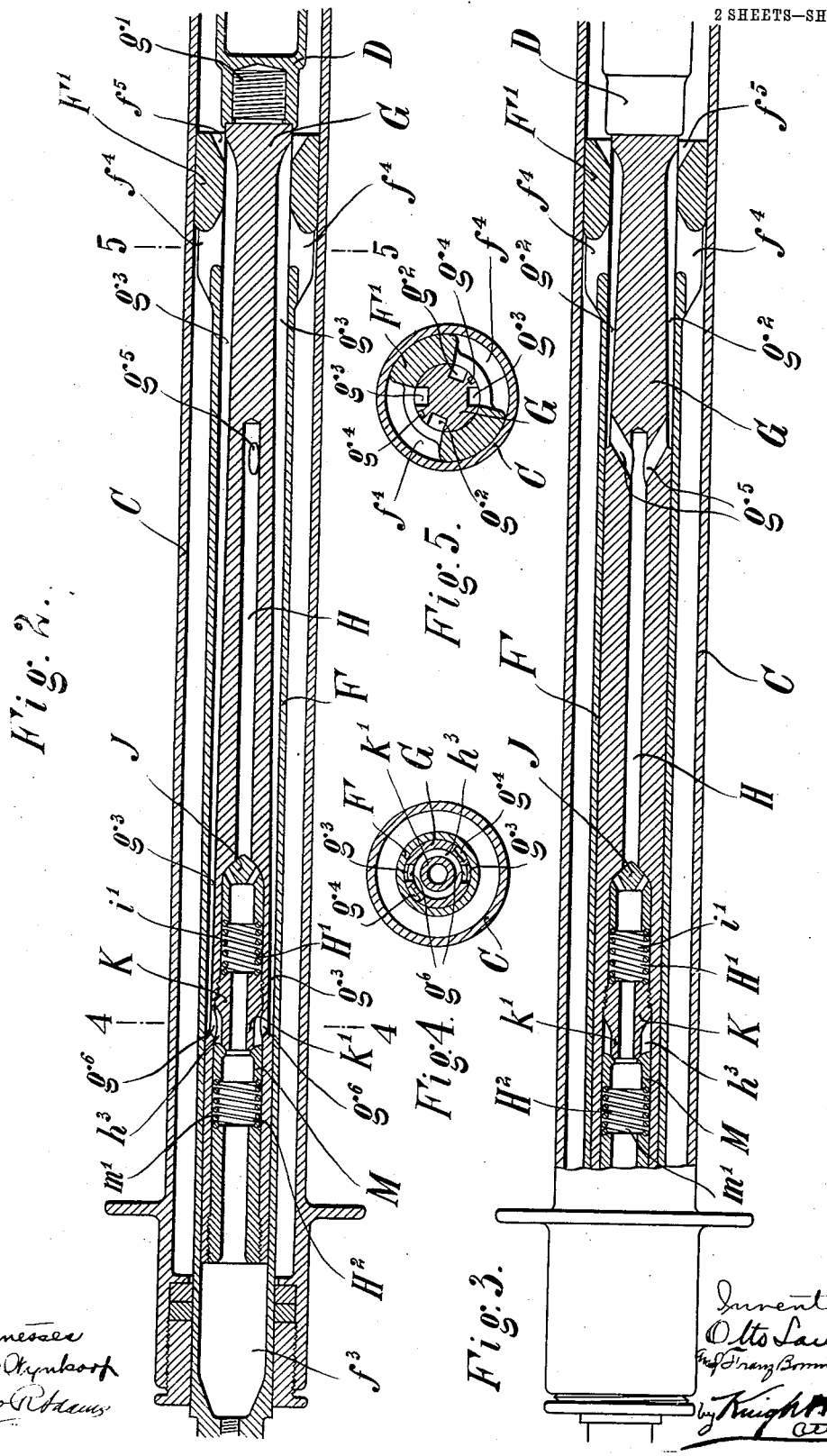

OTTO LAUBER AND FRANZ BÖMINGHAUS, OF ESSEN-ON-THE-RUHR, GERMANY, ASSIGNORS TO FRIED. KRUPP AKTIENGESELLSCHAFT, OF ESSEN-ON-THE-RUHR, GERMANY.

FLUID-BRAKE FOR RECOIL-GUNS.

No. 927,862.   Specification of Letters Patent.   Patented July 13, 1909.

Application filed October 4, 1905. Serial No. 281,312.

*To all whom it may concern:*

Be it known that we, OTTO LAUBER and FRANZ BÖMINGHAUS, residing at Essen-on-the-Ruhr, West, Germany, both subjects of the Emperor of Germany, have invented a certain new and useful Improvement in Fluid-Brakes for Recoil-Guns, of which the following is a specification.

The present invention relates to fluid brakes for recoil guns provided with means for regulating the amount of recoil and the object of the invention is to make the construction of such fluid brakes as compact as possible.

In the accompanying drawing, one embodiment of the invention is shown, by way of example.

Figure 1 shows a side view, partly in section, of the parts of the gun having relation to the invention. Figs. 2 and 3 are two longitudinal sections of the fluid brake in planes at an angle to each other, and on an enlarged scale; Fig. 4 is a section on the line 4—4, Fig. 2, and Fig. 5 is a section on the line 5—5, Fig. 2, looking from the right.

The gun-barrel rests on the slide A (Fig. 1) which is slidably arranged on the cradle B and provided with a horn $a'$ to which the brake cylinder C is rigidly connected. The piston-rod F carrying the piston F' is mounted rotatably but non-slidably, by means of a tap $f^2$ (Fig. 1), in the head $b'$ which closes the cradle. The piston rod F and the piston F', are provided with a central bore $f^3$ (Figs. 1 and 2) which extends from the front face of the piston F' to the tap $f^2$. Into the bore $f^3$ projects a throttling rod G which is of the same diameter as the bore and which, by means of a screw tap $g'$ (Fig. 2), is firmly secured in the plug D which closes that end of the brake cylinder and lies toward the horn $a'$. The outer surface of the throttling-rod G is provided with two pairs of grooves $g^2$ and $g^3$, the relative position of which is shown in Fig. 5. These grooves start in the proximity of the gap $g'$ and extend parallel to the longitudinal axis of the throttling-rod. The grooves $g^2$ (Fig. 3) extend only over a small part of the length of the throttling-rod, while the grooves $g^3$ (Fig. 2) extend almost to the free or forward end of the throttling-rod. These grooves $g^2$ and $g^3$ are of uniform width throughout their length but they decrease in depth in the direction of the arrow $x$, Fig. 1. Two passages $f^4$ in the piston F and an enlargement $f^5$ (Figs. 2 and 3) of the central bore in the piston, provide for communication between the respective grooves $g^2 g^3$ and the fluid spaces in front of and behind the piston. The arrangement of the passages $f^4$ relatively to the grooves $g^2$ and $g^3$ is clearly shown in the drawing. It is, however, to be particularly noted that the parts of the piston F' which lie between the passages $f^4$ are wider circumferentially than the grooves $g^3$.

The device as above described serves the purpose of regulating the length of the recoil and its operation is as follows: When the parts assume the position shown in the drawing, and recoil of the gun-barrel, brake cylinder, and throttling-rod takes place, the fluid passes from the front part of the cylinder to the part behind the piston through the passages $f^4$ of the piston, the grooves $g^2$, $g^3$ of the throttling-rod and the enlargement $f^5$ of the central bore in the piston. During the movement of the throttling-rod, the passage for the fluid will be more and more restricted by reason of the decreasing depth of the grooves $g^2$ and $g^3$ and the fluid will, therefore, be throttled to a gradually increasing extent. When the ends of the grooves $g^2$ have passed beyond the passages $f^4$, the communication is restricted to the gradually decreasing cross-sections of the grooves $g^3$, alone. When the ends of the grooves $g^3$ have passed beyond the passages $f^4$, the fluid cannot any longer pass from the front chamber to the rear chamber of the cylinder and the moving parts are, therefore, brought to a standstill. This, however, does not take place until the piston has made its entire stroke, owing to the extent of the grooves $g^3$. If it is desired to get a very short recoil, the piston-rod is turned by hand or automatically until the grooves $g^3$ are covered by the solid parts of the piston F', in which case communication between the fluid spaces on the two sides of the piston is restricted to the grooves $g^2$ alone. The grooves $g^2$ pass beyond the passages $f^4$, and the passage of the fluid, therefore, is cut off and the moving parts are brought to a standstill, after a very short recoil.

It will readily be understood that other lengths or characters of recoil may be obtained, besides the longest and shortest above mentioned, by further changing the relative position of the piston and the grooves $g^2$ and $g^3$.

In order to obtain a smooth return to battery for each length of recoil, the following arrangement is provided: Each of the forward ends of the grooves $g^2$ communicates with the part H of a central bore H, H', H², in the throttling-rod, through the medium of a passage $g^5$. The bore extends from the passage $g^5$ to the front end of the throttling-rod and at the point where the part H opens into the enlarged part H', a check valve J is provided, which is pressed against its seat by a spring $i'$. Into the wall of the part H' is screwed a cylindrical sleeve K. The front part $k'$ of the sleeve K is of less outer diameter than the part H² of the bore into which it projects thereby leaving an annular space $h^3$ between the wall of the part H² and the outer wall of the part $k'$, which space communicates with the forward end of the grooves $g^3$ through the medium of a pair of passages $g^6$. The free end of the part $k'$ of the sleeve K is of conical shape so as to form a seat for an annular check-valve M which lies against the wall of the bore H² and is held on its seat by a spring $m'$.

By virtue of the above described arrangement, the fluid can pass, during recoil, from the fluid space of the cylinder C in front of the piston to the space $f^3$ in the piston-rod through the passages $f^4$, the grooves $g^2$ and $g^3$, the passages $g^5$ and $g^6$ and so on, the valves J and M, being forced from their seats against the action of the springs $i'$ and $m'$. On the return to battery, the fluid cannot pass the same way from the space $f^3$ to the front space of the cylinder, as the valves J and M in this instance act as check-valves. The passage of the fluid in such case is through a pair of longitudinal grooves $g^4$ (Figs. 1, 4 and 5), in the outer face of the throttle-rod, which grooves extend to the front end of the throttle-rod. The cross sectional area of the grooves $g^4$ is but small in proportion to the cross sectional area of the grooves $g^2$, $g^3$, in order to insure a return to battery without shock. A recuperator spring R of known construction (Fig. 1) serves the purpose of returning the barrel to battery.

When the above described device for regulating the return to battery is combined with the described device for regulating the length of the recoil, the effect of the latter device will be somewhat influenced, though not materially changed.

As a matter of course, the device for regulating the return to battery may be omitted or replaced by a device of different construction without departing from the scope of the invention as far as the regulation of the length of the recoil is concerned.

Having thus described the invention, what is claimed as new therein is:

1. In a fluid brake for recoil-guns, the combination with the hollow piston and hollow piston-rod, the piston being provided with a passage through which the fluid passes from one side of the piston to the other; of a throttling-rod working in the piston and piston rod and provided with longitudinal grooves of different lengths each adapted to form a part of said passage when brought into proper relation thereto, and a passage providing communication between said grooves and the hollow space of the piston rod, to admit to the latter, fluid utilized in controlling the return movement of the gun barrel.

2. In a fluid brake for recoil-guns, the combination with the hollow piston and hollow piston-rod, the piston being provided with a passage through which the fluid passes from one side of the piston to the other; of a throttling-rod working in the piston and piston rod and provided with longitudinal grooves of different lengths adapted to form a part of said passage, passages admitting fluid from said grooves to the hollow space of the piston rod and containing check-valves resisting back flow therethrough, and a restricted passage from said hollow space of the piston rod to the brake cylinder in front of the piston.

3. In a fluid brake, the combination with the cylinder, the hollow piston rod and the piston carried thereby, of a throttling rod working in the piston rod, controlling the flow from one side of the piston to the other, and provided with a passage providing communication between the cylinder and the hollow space of the piston rod, a check valve controlling the communication between the cylinder and the hollow space, and means furnishing an outlet from the hollow space to the cylinder.

4. In a fluid brake the combination with a cylinder and a piston of a hollow piston rod, a rod moving in the hollow piston rod, means furnishing a communication from the cylinder space to the hollow space in the piston rod, a check valve controlling such communication, and means furnishing an outlet from the hollow space to the cylinder.

The foregoing specification signed at Düsseldorf, this twenty-fifth day of September, 1905.

OTTO LAUBER.
FRANZ BÖMINGHAUS.

In presence of—
 WILLIAM ESSENWEIN,
 ERNEST BODRE.